H. B. JOHNSON.
Picture-Frame.

No. 222,279.   Patented Dec. 2, 1879.

UNITED STATES PATENT OFFICE.

HAMILTON B. JOHNSON, OF MILNERSVILLE, OHIO.

IMPROVEMENT IN PICTURE-FRAMES.

Specification forming part of Letters Patent No. 222,279, dated December 2, 1879; application filed August 23, 1879.

*To all whom it may concern:*

Be it known that I, HAMILTON B. JOHNSON, of Milnersville, in the county of Guernsey and State of Ohio, have invented certain new and useful Improvements in Picture-Frames; and I do hereby declare that the following is a full, clear, and exact description of the invention, which will enable others skilled in the art to which it appertains to make and use the same, reference being had to the accompanying drawings, which form a part of this specification, and in which—

Figure 1:
Figure 2:
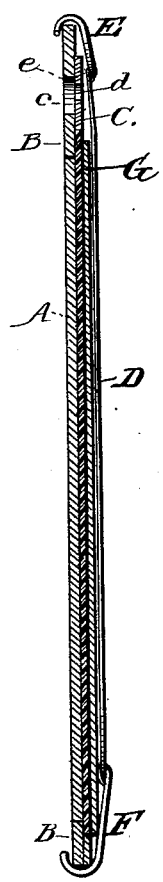

Figure 1 is a front view, and Fig. 2 is a longitudinal section.

Similar letters of reference indicate corresponding parts in both the figures.

This invention has relation to that class of picture-frames adapted chiefly for photographs and smaller pictures in which the light and frame are made in one piece, consisting of a single plate of glass with opaque ornamental edges to form the frame surrounding the central opening or light; and it consists in the improvements hereinafter fully described, and particularly pointed out in the claims.

In the annexed drawings, the letter A represents the transparent middle part or light of the frame, which may be of any suitable size and configuration; and B is the opaque border, which is formed simply by painting upon the back of the glass with suitable dark color or colors to produce an ornamental effect in a manner well understood; or paper or other material may be pasted along the edges of the back part of the glass plate to form the opaque border or frame B.

The upper part, $b$, of the glass plate is perforated, as shown at $c$, by means of which the frame may be suspended upon a hook or nail in the wall; and in order to prevent the edges of the aperture $c$ from chipping when the frame is inserted upon or removed from the picture-nail, I provide the back part of the aperture $c$ with a guard or washer, C, consisting of a circular disk of pasteboard or similar material, which is provided with a central aperture, $d$, of smaller dimensions than $c$, so as to form an annular overlapping flange, $e$, back of the aperture $c$, as will be seen more clearly by reference to Fig. 2 of the drawings. This projecting flange or shoulder will protect the glass from chipping or becoming notched around the aperture or opening $c$, by which the frame is suspended.

The photograph or other picture is held in the frame A B by elastic cords D D, secured at the top in a hooked bail, E, which is slipped over the upper edge of the frame, as shown in the drawings, and at their ends in hooks F F, which are, in like manner, slipped over the lower edge of the frame, one close to each side thereof, as shown in Fig. 1.

The tension of the elastic cords D D will keep the upper bail, E, and lower hooks, F F, in place, and pressing against the back of the picture (denoted by the letter G in Fig. 2 of the drawings) will hold this in its proper position. If it is desired to change the picture in the frame this can readily be effected in a moment by slipping off the bail E and hooks F F, which, after the change has been effected, can be as easily and readily replaced.

Having thus described my invention, I claim and desire to secure by Letters Patent of the United States—

1. A picture-frame consisting of a single glass plate provided with opaque ornamental borders forming the inclosure of the central transparent part or light, the upper part of said opaque border being provided with an aperture, $c$, and with a circular perforated disk or guard, C, set back of and overlapping the aperture $c$ in the glass plate, substantially as and for the purpose herein shown and described.

2. The combination, with the picture-frame A B, of the elastic cords D D, hooked bail E, and hooks F F, substantially as and for the purpose herein shown and set forth.

In testimony that I claim the foregoing as my own I have hereunto affixed my signature in presence of two witnesses.

HAMILTON B. JOHNSON.

Witnesses:
SAMUEL W. LUCCOCK,
BENJAMIN KENNEDY.